(12) United States Patent
Sipos et al.

(10) Patent No.: US 10,140,172 B2
(45) Date of Patent: Nov. 27, 2018

(54) NETWORK-AWARE STORAGE REPAIRS

(71) Applicant: CISCO TECHNOLOGY, INC., San Jose, CA (US)

(72) Inventors: Marton Akos Sipos, Chelsea, MA (US); Joshua Gahm, Newtonville, MA (US); Narayan Venkat, Westford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/253,346

(22) Filed: Aug. 31, 2016

(65) Prior Publication Data
US 2017/0337097 A1 Nov. 23, 2017

Related U.S. Application Data

(60) Provisional application No. 62/338,238, filed on May 18, 2016.

(51) Int. Cl.
G06F 11/00 (2006.01)
G06F 11/07 (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC . G06F 11/008; G06F 11/3409; G06F 11/3452
(Continued)

(56) References Cited

U.S. PATENT DOCUMENTS 4,688,695 A   8/1987   Hirohata
5,263,003 A   11/1993   Cowles et al.
(Continued)

FOREIGN PATENT DOCUMENTS

EP   2228719   9/2010
EP   2439637   4/2012
(Continued)

OTHER PUBLICATIONS

Aweya, James, et al., "Multi-level active queue management with dynamic thresholds," Elsevier, Computer Communications 25 (2002) pp. 756-771.

(Continued)

*Primary Examiner* — Sarai E Butler
(74) *Attorney, Agent, or Firm* — Polsinelli PC

(57) ABSTRACT

In an example, there is disclosed a computing apparatus, having one or more logic elements, including at least one hardware logic element, comprising a network-aware data repair engine to compute a feasible repair log for n fragments of an original data structure, comprising: receiving a predictive failure scenario; identifying at least one repair $\xi_i$ for the failure scenario; determining that $\xi_i$ is feasible; and logging $\xi_i$ to a feasible repair log. When a node failure occurs, a network cost may be computed for each repair in the feasible repair log, and an optimal repair may be selected.

18 Claims, 9 Drawing Sheets

(51) Int. Cl.
*G06F 11/30* (2006.01)
*G06F 11/34* (2006.01)

(52) U.S. Cl.
CPC ...... *G06F 11/0787* (2013.01); *G06F 11/0793* (2013.01); *G06F 11/3006* (2013.01); *G06F 11/3476* (2013.01); *G06F 11/3495* (2013.01)

(58) Field of Classification Search
USPC .......................................................... 714/37
See application file for complete search history.

(56) References Cited

U.S. PATENT DOCUMENTS

| | | | |
|---|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |

(56) References Cited

U.S. PATENT DOCUMENTS

| | | |
|---|---|---|
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0153863 A1 | 8/2004 | Klotz et al. |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0185597 A1 | 8/2005 | Le et al. |
| 2005/0188170 A1 | 8/2005 | Yamamoto |
| 2005/0235072 A1 | 10/2005 | Smith et al. |
| 2005/0283658 A1* | 12/2005 | Clark ............... G06F 11/2028 714/11 |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0094465 A1 | 4/2007 | Sharma et al. |

(56) References Cited

U.S. PATENT DOCUMENTS

| | | |
|---|---|---|
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1* | 2/2011 | Scholer .............. G05B 23/0224 714/47.3 |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0210041 A1 | 8/2012 | Flynn et al. |
| 2012/0254440 A1 | 10/2012 | Wang |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |

(56) References Cited

U.S. PATENT DOCUMENTS

| | | |
|---|---|---|
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0281067 A1 | 10/2015 | Wu |
| 2015/0303949 A1* | 10/2015 | Jafarkhani .......... H03M 13/617 |
| | | 714/764 |
| 2015/0341237 A1 | 11/2015 | Cuni et al. |
| 2015/0341239 A1 | 11/2015 | Bertran Ortiz et al. |
| 2015/0358136 A1* | 12/2015 | Medard .............. H04L 5/0055 |
| | | 370/441 |
| 2015/0379150 A1 | 12/2015 | Duda |
| 2016/0011936 A1* | 1/2016 | Luby .................. G06F 3/0617 |
| | | 714/6.2 |
| 2016/0011942 A1 | 1/2016 | Golbourn et al. |
| 2016/0062820 A1* | 3/2016 | Jones ................. G06K 9/6265 |
| | | 714/37 |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0205189 A1 | 7/2016 | Mopur et al. |
| 2016/0210161 A1 | 7/2016 | Rosset et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1* | 12/2016 | Jenkins, Jr. ......... G06F 11/2069 |
| | | 714/6.3 |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0277655 A1 | 9/2017 | Das et al. |
| 2017/0340113 A1 | 11/2017 | Charest et al. |
| 2017/0371558 A1 | 12/2017 | George et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Petersen, Chris, "Introducing Lightning: A flexible NVMe JBOF," Mar. 9, 2016, 6 pages.

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, ©2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-without-altering-the-actual-crc-checksum.

Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

(56) References Cited

OTHER PUBLICATIONS

Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer, Enabiling Confidence in Application Performance Before Deployment," 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks An Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Infrastructure for the Cloud," Solution Brief, © 2012, 3 pages; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "VBLOCK Solution for SAP: Simplified Provisioning for Operation Efficiency," VCE White Paper, VCE—The Virtual Computing Environment Company, Aug. 2011, 11 pages.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28th to Mar. 4th, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," 13$^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, EMC$^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology Of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23,-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, Ao, et al., "RAIDShield: Characterizing, Monitoring, and Proactively Protecting Against Disk Failures," FAST '15, 13$^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.

(56) References Cited

OTHER PUBLICATIONS

Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07, 5th USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "CEPH: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology Of China, 2012, 12 pages.

\* cited by examiner

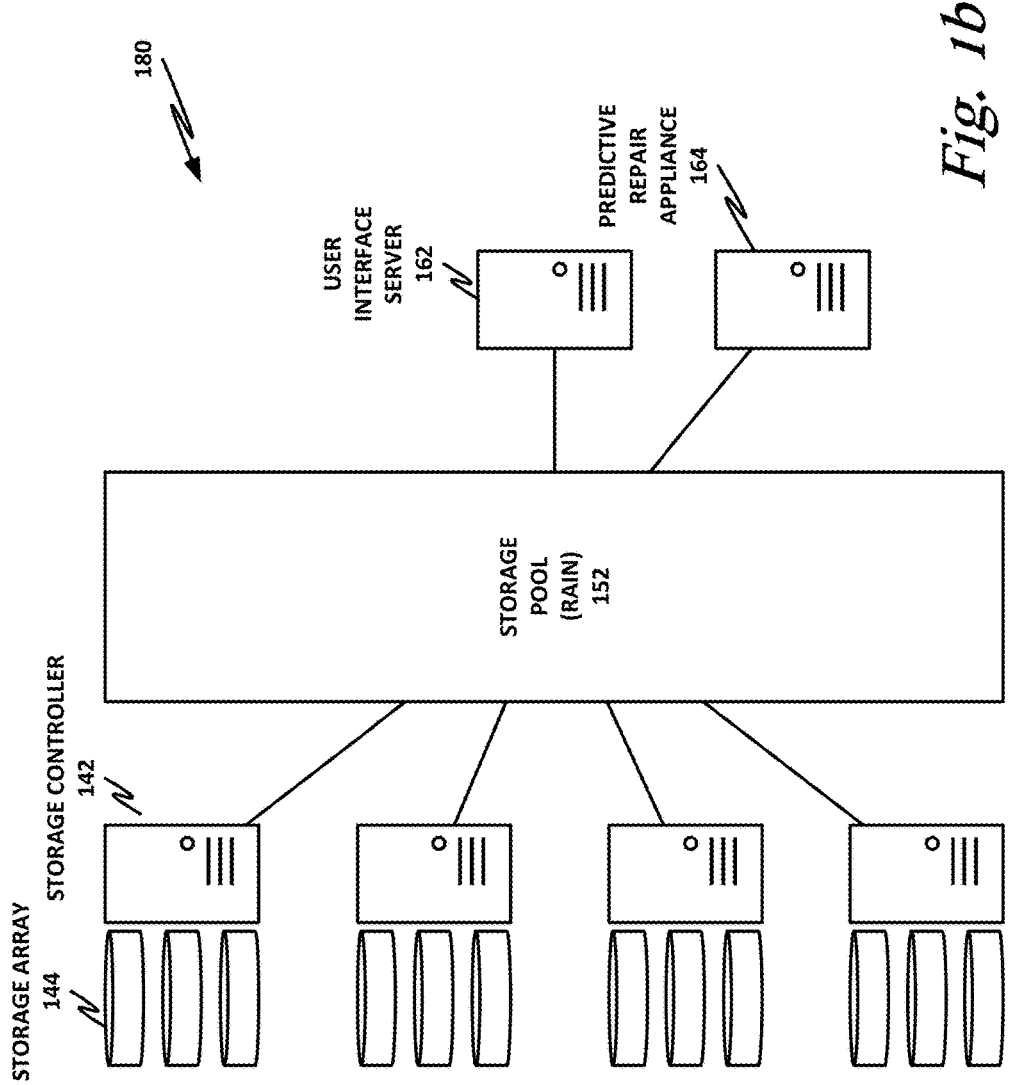

NETWORK-AWARE STORAGE REPAIRS

CROSS REFERENCE TO RELATED APPLICATION

This Application claims priority to U.S. Provisional Application No. 62/338,238, titled "Network-Aware Repairs," filed May 18, 2016, which is incorporated herein by reference.

FIELD OF THE SPECIFICATION

This disclosure relates in general to the field of computer networking, and more particularly, though not exclusively to, a system and method for network-aware storage repairs.

BACKGROUND

Modern storage systems, particularly for large enterprise or cloud-based backup storage solutions, are much more sophisticated than storage solutions that rely on simply storing one or more complete copies of a data structure in one or more locations. Modern storage solutions may rely on architectures such as redundant array of independent disks (RAID) or redundant array of independent nodes (RAIN).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 1A and 1B are block diagrams of a network architecture according with a cloud backup solution to one or more examples of the present specification.

SUMMARY

Figure 1A:
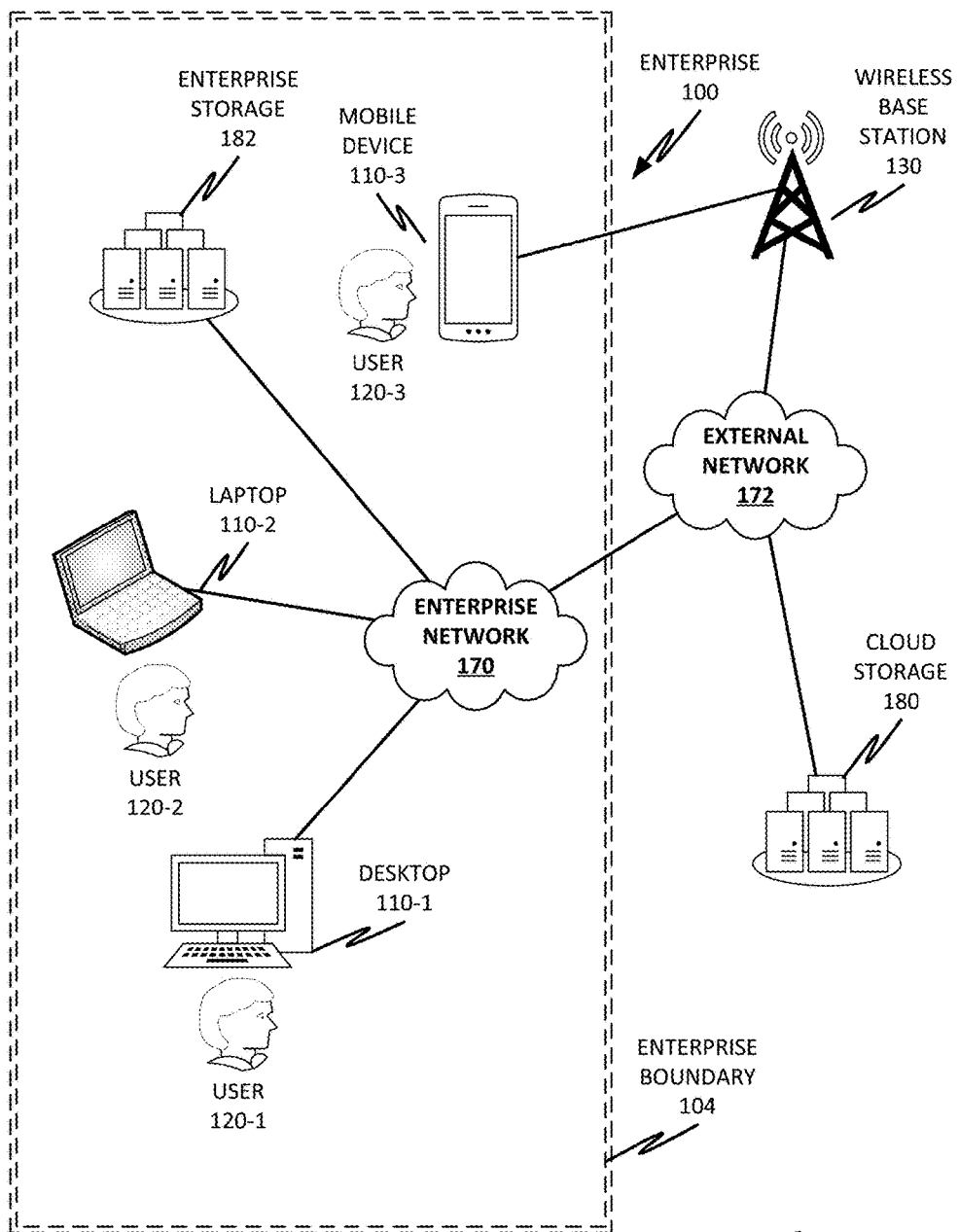

In an example, there is disclosed a computing apparatus, having one or more logic elements, including at least one hardware logic element, comprising a network-aware data repair engine to compute a feasible repair log for n fragments of an original data structure, comprising: receiving a predictive failure scenario; identifying at least one repair $\xi_i$ for the failure scenario; determining that $\xi_i$ is feasible; and logging $\xi_i$ to a feasible repair log. When a node failure occurs, a network cost may be computed for each repair in the feasible repair log, and an optimal repair may be selected.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Modern computer users, both individuals and enterprises, increasingly find important aspects of their lives or businesses stored in digital form on disk drives and in the cloud. Many individuals and enterprises have gone "paperless," moving all important records to digital storage and relying less on paper files. While this offers great advantages in storage density and ease of retrieval, it also means that it is critical to ensure that digital data are not permanently lost.

While online and offline backups of critical data have long been standard procedure for enterprises, even individuals and families are beginning to realize the need for protecting critical data from loss. On-site solutions for backup can include a redundant array of interconnected disks (RAID), in which a single controller is connected to a number of disks to provide redundancy, or redundant array of interconnected nodes (RAIN), in which a number of nodes, each having a controller and one or more disks, are interconnected to provide redundancy. RAID, RAIN, and other storage schemes that rely on distributed data may be referred to as "distributed storage systems" (DSS) herein. Off-site backups often rely on "cloud" services that permit users to upload data, and then store the data in a large data center, which may employ DSS.

Storage in a DSS often relies on "erasure encoding," in which an data structure is mathematically transformed into n different fragments. Throughout this specification, the "original data structure" may also be referred to for convenience as a "file," though this should be understood to broadly include by way of nonlimiting example, any single file, with or without accompanying metadata, including filesystem metadata (e.g., an electronic document, recording, video, drawing, database, folder, or similar), collection of files, disk image (e.g., ".raw," ".img," ".iso," ".bin"), piece of a spanned file, compressed file (e.g., ".zip," ".tgz," ".tar.gz," ".7z"), archive file (e.g., "tar," "rar"), or any other type of original data structure that may be stored for later retrieval. The n coded fragments are referred to herein as "fragments," and as used in this specification, that term should be understood to include any suitable piece of a file from which the full file may be reconstructed (alone or in conjunction with other fragments), including the formal pieces of a file yielded by the erasure coding technique.

The fragments may be stored on physically separate disks. These fragments may together have the maximum distance separable (MDS) property, which means that any k fragments may be used to reconstruct the original file. This is sometimes referred to as (n,k) Coding. For example in the case where n is 6 and k is 4, the original data structure might be stored with one fragment on each of 6 storage nodes, and if any one of the storage nodes fail, it is possible to reconstruct the original file from any four of the five remaining fragments. If two nodes fail, it is possible to reconstruct from the four remaining fragments. If three nodes fail, it is not possible to reconstruct the original file. This is illustrated in more detail in FIGS. 4-6 below.

Thus, when a node failure occurs, it may be desirable to reconstruct the erasure encoded file, so that once again the full n fragments are available for redundancy. An (n,k) coding can be reconstructed from k fragments, and is a processor-intensive task. Also note that it is possible to reconstruct a fragment that is usable with some other fragments, but that does not preserve the MDS property. For example, if fragment 1 fails, it is possible to reconstruct a fragment that could be used with fragments 2, 3, and 4 to reconstruct the original file, but not with fragments 5 and 6, thus losing the MDS property. If a repair results in a group of n fragments, including the proposed newly-constructed fragment, that preserve the MDS property, the repair is considered "feasible." If a repair results in a group of n fragments, including the proposed newly-constructed fragment, that do not preserve the MDS property, the repair is considered "unfeasible." Of all possible feasible repairs, the one with the least weighted cost of repair (discussed below), may be considered "optimal."

In an example, a file or other original data structure to be stored in a DSS is broken up into k fragments of identical size. It is then encoded using an erasure code to produce n coded pieces ("fragments"). These are then distributed to the N nodes: $\Omega_N = node_1\ node_2\ \ldots\ node_N$, with each storing exactly $\alpha$. When $node_f$ fails, all fragments it stored are considered lost and must be repaired onto a replacement node. The replacement node may be designated with the same name. Consider repairs, where the surviving nodes can transfer different numbers $\beta_i$ of fragments to $node_f$: $\xi=(\beta_1\ \beta_2\ \ldots\ \beta_N)$. The list of all possible repairs of a code where $node_f$ was lost is called its repair space: $\Xi=\{\xi | 0 \leq \xi[i] \leq \alpha$ and $\xi[f]=0\}$.

In this example for simplicity, the method considers only single node losses (which are the most common type in systems with well-separated failure domains). Consider storage systems and codes with parameters that are N, n, k, $\alpha$, $\in N^+$, $\beta_i \in N$.

A repair is feasible if the resulting system state maintains data recoverability after sustaining subsequent concurrent node losses. Each code, based on its parameters, therefore has a maximum number of L nodes it can lose concurrently while maintaining data recoverability. For codes employing exact repair like Reed-Solomon and repair by transfer (RBT)-minimum bandwidth regenerating (MBR) (together RBT-MBR), the set of feasible repairs $\Xi_f$ and L are defined by the structure of the code. For regenerating codes employing functional repair, the set of feasible repairs is constrained by both the information flow graph and the code construction. A flow to a data collector of at least n must be maintained with any L vertices from the final level of topological sorting removed from the graph. For codes using random coefficients such as RLNC, further checks are necessary to ensure that the selection of coefficients does not introduce linear dependence not portrayed on the information flow graph.

As faster storage devices become commercially viable alternatives to disk drives, the network may become a bottleneck in achieving good performance in DSSs. This is especially true for erasure coded storage, where the reconstruction of lost data can significantly encumber the system. DSS has in the past trended towards erasure coding to control the costs of storing and ensuring the resilience of large volumes of data. Even though most distributed storage systems employ replication to ensure data resilience, erasure coding provides equivalent or better resilience while using a fraction of the raw storage capacity required for replication. For example, by storing three full copies of the original data structure, any two can be lost without losing the original data structure. But by storing six coded fragments, any four of which can be used to reconstruct the original data structure, and may be substantially less costly (in terms of both disk usage and bandwidth) than storing three full copies of the original data structure.

In some cases, encoding and decoding operations may be offloaded to graphics processing units (GPUs), field-programmable gate arrays (FPGAs), or application-specific integrated circuits (ASICs). Modern software libraries may also help to lower computation costs of these operations, potentially expanding the set of cost-effective use cases for erasure coded storage. Additionally, the increased IOP density and IO bandwidth of next generation storage devices, such as NVMe (Non-Volatile Memory Express), as compared with rotating media or earlier SSD devices, lowers the IO costs associated with coded storage, further expanding the set of use cases.

However, some existing network interfaces have not seen as much increase in throughput as storage and compute units. Unlike replicated storage where data can be recovered by simply copying the lost fragments from surviving nodes, repairing erasure coded pieces involves retrieving significantly more data. For example, Reed-Solomon (RS) is widely used for its storage efficiency for a given level of reliability. But repairing lost fragments requires as many coded fragments as are required to recover the original data. So network topology and current traffic conditions play a crucial role in repair performance. To reflect these attributes, costs can be assigned to the transfer of fragments between nodes. However, a cost function that only aims to minimize the number of transferred fragments may be suboptimal. An approach that is not network-aware may simply select any feasible repair with the fewest fragments transferred. But this may in fact be a suboptimal choice for a particular cost function. This raises two questions: how much do different types of codes benefit from being network-aware, and where can the lowest cost feasible repairs be found in the repair space independent of the cost function used?

Methods of the present disclosure make the repair of erasure-coded data network-aware by introducing a mechanism that computes the feasibility of different possible repairs in advance. When a storage node fails, a repair is selected based on a cost function that reflects the current state of network connectivity among the storage nodes. By performing the computationally-intensive feasibility checks in advance, the system is able to react to a node loss quickly, and can still base the repair selection on up-to-date network traffic data. This specification also discloses techniques to reduce the number of repairs to consider independent of the cost function in use. This aspect is beneficial, for example, in random linear network coding (RLNC), where the set of feasible repairs of potentially lowest cost may be of exponential size when using an approach that is not network-aware.

DSSs that employ erasure coding can be significantly encumbered by network transfers associated with repairing data on unavailable nodes. Unlike replicated storage where data can be recovered by simply copying the lost file (or file fragments) from surviving nodes, repairing erasure coded pieces involves retrieving significantly more data. This means that in an erasure encoded repair situation, fewer network resources may be available to regular read and write operations.

Using a repair strategy that takes network topology and state into consideration can ameliorate this. However, for many erasure codes it is computationally expensive to determine which repairs ensure that data is successfully repaired. Indeed, in some cases, information on the state of the network may be outdated by the time the check is complete.

In particular, many RLNCs of practical interest have a large repair space. For example, consider a DSS comprising 10 nodes, where each node stores two linear combinations, and a total of 10 linear combinations are required to decode original content. The size of the repair space of such a code with knowledge of which node has failed includes 177,147 possibilities. Furthermore, to ensure that the system retains the ability to recover data from any 5 nodes, the rank of 924 matrices of size 10×10 should be checked for each repair. This amounts to a total of close to 163 million checks. Even if parts of the repair space do not need to be considered based on knowledge of code construction, it is impractical to compute the set of feasible repairs in real time.

The network cost functions may be defined by a matrix C, where $c_{i,j}$ denotes the cost to transfer a single fragment from $node_i$ to $node_j$ and C[j] is column j that contains the costs associated with transfers to $node_j$. In this example, two restrictions are placed on C. First, the diagonal elements must be $c_{i,j}=0$. Second, all other elements $i \neq j$, $c_{i,j} \geq 0$.

$$C = \begin{pmatrix} 0 & \cdots & c_{1,N} \\ \vdots & \ddots & \vdots \\ c_{N,1} & \cdots & 0 \end{pmatrix} \quad \text{Equation 1}$$

This general way of modeling costs makes the method applicable to different network topologies and traffic patterns. It can be based on any number of measured parameters such as available bandwidth, latencies, number of dropped packets, or queueing delays, by way of nonlimiting example. It can be used for, but is not limited to, minimizing the total time required for repairing lost data. In an example, it is assumed that the cost of transferring a single fragment from $node_i$ to $node_j$ may not be dependent on the total number of fragments sent between them in the period in which the cost is regarded as accurate. This assumption is valid if the examined period is short, or the total traffic between $node_i$ and $node_j$ is a negligible fraction of the traffic flowing on the same links.

The network-aware cost-weighted repair space of the code may be evaluated with the weighted cost for repairing data on $node_f$ using repair $\xi_i$ is $cost(\xi_i) = \xi_i C[f]$.

A network repair engine selects the lowest cost repair that is independent of the erasure code and network topology, illustrated in pseudocode as:

```
//initial data distribution
precompute_feasibility;
cost_min := ∞
repeat
  //node_f fails
  for ξ_i ∈ Ξ_f^- do
    if cost(ξ_i) = ξ_iC[f] < cost_min then
      cost_min := cost(ξ_i)
      ξ_sel := ξ_i
    end if
  end for
  execute ξ_sel
```

```
precompute_feasibility
until false
```

Whenever there is a change in the layout of the data (the initial distribution of data and any subsequent repairs), the set of feasible repairs $\Xi_f^-$ is computed for each possible subsequent node failure. The implementation of the is_feasible( ) function is determined by the erasure code in question and the definition of feasibility as discussed above. The computation is illustrated by the following pseudocode:

```
procedure precompute_feasibility
  Ξ_f^- := { }
  for node_i ∈ Ω_N do
    for ξ_j ∈ Ξ_i do
      if is_feasible (ξ_j) then
        Ξ_f^- := Ξ_f^- ∪ ξ_j
      end if
    end for
  end for
end procedure
```

When a node fails, the cost for each feasible repair is calculated based on a cost function reflecting up-to-date network conditions. The practical applicability of this method is determined, in certain embodiments, by the complexity of the is_feasible( ) function, and the sizes of $\Xi_f$ and $\Xi_f^-$.

Certain embodiments of the present specification also provide specific optimizations for the different erasure codes to reduce the number of repairs to consider, and to be able to characterize the repair space of each code in terms of where the lowest-cost feasible repairs are. The codes cover a range of different repair mechanisms and points on the storage-repair bandwidth tradeoff curve.

The examples below assume that $node_f$ goes down. In this case, the network-aware repair engine finds the minimum cost feasible repair $\xi_{min}$ and its associated cost: $\kappa = cost(\xi_{min}) = \sum_{i=1}^{N-1} \beta_i c_{i,f}$.

In an example, decoding-based repair is performed according to Reed-Solomon (RS). This may be applied to any linear MDS code. In this example, the evaluation is restricted to the $\alpha=1$ case (i.e., one node failure), as this is in line with how RS is generally used for storage.

Let $c^1, c^2, \ldots c^{N-1}: c^i \in set(C|f) \setminus c_{f,f}$ be a permutation cost in ascending order, and $\beta^1, \beta^2, \ldots \beta^{N-1}$ the corresponding number of transferred fragments. The cost of the minimal cost of repairs is:

$$\kappa_{RS} = \sum_{i=1}^{n} c^i. \quad \text{Equation 2}$$

The number of feasible repairs to consider given no knowledge of C is $$|\Xi_f^-| = \binom{n}{k}.$$

In the case of RBT-MBR, there are two distinct repair strategies to consider. Ideally, each surviving node transfers a single encoded fragment ($\beta_i=1$, $i \neq f$), as defined above.

Alternatively, if at least n distinct fragments are transferred, the decoding of the embedded MDS code can take place and any missing code words can be re-encoded. While this second repair strategy involved additional bandwidth and computation, it can result in lower transfer costs for some C. Let $c^i$ and $\beta^i$ be defined the same way as in the previous subsection. The cost of optimal repair $\kappa_{RBT-MBR}$ is based on the two repair strategies:

$$\kappa_{RBT-MBR} = \min\left(\sum_{i=1}^{N-1} c^i, \sum_{i=1}^{N-L}(\alpha - i + 1)c^i\right). \quad \text{Equation 3}$$

The first term is the cost of transferring a single fragment from each surviving node. The second term expresses retrieving as many fragments from the lower cost nodes as possible without getting duplicates. $\rho_{i=1}^{N-L}(\alpha-i+1)=n$ because the embedded code is MDS, and because of the way RBT-MBR is constructed. With no knowledge of C, the number of repairs that are potentially lowest cost is reduced to $$|\Xi_f^-| = 1 + (N-L)!\binom{N-1}{N-L}.$$

Unlike the previous examples, network coding does not have a fixed repair strategy. In an example, to limit the search for $\Xi_f$, the network-aware repair engine analyzes an information flow graph. During a repair, any L sized selection of nodes must transfer at least $\alpha$ fragments for the system to be able to sustain the loss of L nodes following the repair, as shown here:

$$\sum_{i=1}^{L} \beta^i \geq \alpha. \quad \text{Equation 4}$$

This constraint is necessary and sufficient to ensure that the number of edge-disjoint paths on the information flow graph between the data source and a data collector does not decrease if L nodes are subsequently lost. Let $\beta^1, \beta^2, \ldots, \beta^{N-1}$ be a permutation of fragments transferred from remaining nodes of ascending order and $c^1, c^2, \ldots c^{N-1}$ the respective costs from set(C|f|)\c_{f,f}.

Taking the summation above into consideration, a more specific cost function can be defined for the optimal repair, considering repairs $\Sigma_{i=1}^{N-1}\beta_i \leq n$ as follows:

$$\kappa_{RLNC} = \sum_{i=1}^{L} c^i \beta^i + \sum_{i=L+1}^{N-1} c^i \beta^L = \sum_{i=1}^{L-1} c^i \beta^i + \beta^L \sum_{i=L}^{N-1} c^i. \quad \text{Equation 5}$$

The first term expresses the cost for the L lowest values of $\beta^i$, the second term the cost for the rest of the nodes. Each of these must transfer at least $\beta^L$ to satisfy Equation 4. In this example, $\kappa_{RLNC}$ is minimized if the $c^i$ are in descending order, i.e. transferring more from cheaper nodes, and less from expensive nodes. The free variables are thus reduced to $\beta^1, \beta^2, \ldots, \beta^L$. Given that Equation 4 should be satisfied with equality for $\xi_{min}$, this leads to a significant reduction in the number of potential repairs to consider, as shown here:

$$|\Xi_f^-| = \left|\left\{\xi: \sum_{i=1}^{L} \beta^i = \alpha\right\}\right|. \quad \text{Equation 6}$$

Equation 6 is a constrained integer partitioning problem on L. Furthermore, it determines the positions of the lowest cost feasible repairs in $\Xi_f$. Once C is known, the optimal repair can quickly be selected.

By way of illustrative example of an application of this method, assume two sets of parameters for which RLNC behaves slightly differently depending on C. Assume in this example that last node, $node_N$ failed, and $c_i = c_{i,N}$ are in ascending order. Consider the case of n=12, $\alpha$=6, N=4, and L=2 failures are to be supported. Considering Equation 5, and assuming repairs do not introduce linear dependence, only four of them need to be compared to find $\xi_{min}$:

$\xi_1$=(3 3 3 0), $\xi_2$=(2 4 4 0),
$\xi_3$=(1 5 5 0), $\xi_4$=(0 6 6 0)

For $c_1=c_2+c_3$, all four repairs have the same cost. For c1<c2+c3, $\xi_1$, the most balanced repair with the least amount of fragments transferred, has the lowest cost. On the other hand, for c1>c2+c3, cost($\xi_1$)>cost($\xi_2$)>cost($\xi_3$)>cost($\xi_4$). In other words, the repair transferring the most amount of fragments has the lowest cost. Thus, in these cases a mechanism that only tries to minimize the amount of transferred data may sub-optimally pick $\xi_1$, giving an error of cost($\xi_1$)−cost($\xi_4$)=c1−c2−c3. $\xi_2$ and $\xi_3$ are not the lowest cost repairs regardless of C, so the number of repairs whose feasibility must be checked is greatly reduced to those transferring 9 and 12 fragments, $\xi_1$ and $\xi_4$ in this case.

Now consider the case of n=12, $\alpha$=4, N=6 and require that L=3 node failures be supported. In this case the lowest cost feasible repairs are:

$\xi_1$=(1 1 2 2 2 0), $\xi_2$=(0 2 2 2 2 0),
$\xi_3$=(0 1 3 3 3 0), $\xi_4$=(0 0 4 4 4 0)

The cut-off point between $\xi_1$ and $\xi_4$ is c1+c2=2(c3+c4+c_5). Because of the limited number of ways the number 4 can be reduced to additive components, there are no minimal-cost feasible repairs with a total of 9 or 11 transferred linear combinations. Thus, there may not be a clear decreasing or increasing order of costs like in the previous example. In that case, more repairs may need to be checked for feasibility.

Advantageously in certain embodiments, network-aware erasure encoding finds the least cost repairs more consistently than an approach that selects one of the repairs with the lowest traffic but has no knowledge of transfer costs. For example, an analysis was performed using sets of code parameters (N,a,n) that meet the following constraints: 2<N<20, 1<a<10, 5<n<32, can sustain L>2 node losses without losing data following each repair, and has a storage efficiency of (N*a)/n<2.5. For Reed-Solomon, only a=1 was considered as this maximizes its ability to lose nodes. For RLNC and RBT-MBR, the evaluation was restricted to sets that have a repair space size for a given failed node of at most $2^{16}$ and $2^{24}$ respectively. Fifty sets of parameters meet these constraints for Reed-Solomon, 8 for RBT-MBR, and $2^{14}$ for RLNC.

Each run for each code, costs, and set of code parameters included 100 iterations of node loss and recovery. Operations were performed over $GF(2^8)$. Two types of cost matrices C were considered. First, I: one that is based on a static network topology, where nodes are grouped evenly in racks. Costs have two types: inter-rack (10×) and intra-rack (1×). This model was used to evaluate the benefits of network awareness assuming a simple, static topology. Second, a cost matrix was used that also portrays current network traffic conditions. The same C is multiplied entry wise in each round with a different matrix containing values drawn randomly from the following uniform distributions: II: U(0.75,1.25), III: U(0.5,1.5), IV: U(0.25,1.75), V: U(0,2).

Experimental results verified that erasure coding benefitted substantially from knowledge of C.

|  | Approx. Gain (%) | | |
| --- | --- | --- | --- |
| Matrix | Reed-Solomon | RBT-MBR | RLNC |
| I | ~15% | Negligible | ~8% |
| II | ~20% | ~2% | ~12% |
| III | ~27% | ~5% | ~15% |
| IV | ~32% | ~10% | ~22% |
| V | ~39% | ~20% | ~31% |

In general, the larger the variance in the costs, the larger the gain compared to the non-network-aware approach. Thus, a distributed storage system with more dynamic traffic patterns may see a larger benefit from performing network-aware repairs. For Reed-Solomon and RBT-MBR that use exact repair, most cost types result in a gain from being network aware. In the case of RLNC, although there are sets of parameters that show no or minimal gain, there is a significant gain overall.

A system and method for network-aware storage repair will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1A is a network-level diagram of a networked enterprise 100 according to one or more examples of the present Specification. Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Enterprise 100 may provide an enterprise storage solution 182, which may be provided in addition to or instead of cloud storage service 180.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, and a cloud storage service 180.

Wireless base station 130 may provide mobile network services to one or more mobile devices 110, both within and without enterprise boundary 104.

It may be a goal of enterprise 100 to operate its network smoothly, which may include backing up data to enterprise storage 182 and/or cloud backup service 180. In certain embodiments, cloud backup service 180 may provide several advantages over on-site backup, such as lower cost, less need for network administration personnel, greater redundancy, and multiple points of failure. Cloud backup service 180 may be particularly important to small businesses, families, and other smaller enterprises that cannot afford to have dedicated data centers in multiple geographic locations.

Note that although cloud backup service 180 and enterprise storage 182 are disclosed herein by way of nonlimiting example, the teachings of this specification may be equally applicable to other storage methodologies.

FIG. 1B is a block diagram that more particularly discloses cloud storage service 180. In this example, a RAIN configuration is used. Specifically, a RAIN storage pool 152 is provided, which in this example includes a plurality of storage controllers 142, each of which may have attached thereto one or more physical disks in a storage array 144. RAIN storage pool 152 may not have a central controller in certain embodiments. Rather, commonly-used algorithms may be used for the nodes to elect among themselves a "root" node, which may coordinate the other nodes for so long as it remains the root node. The identity of the root node may change over time as network conditions change, and as different nodes become loaded in different ways.

RAIN storage pool 152 may be configured for network-aware storage repairs according to the methods disclosed herein. When precomputing feasibility, one node may be elected to perform the computation, similar to how a root node is elected, or a plurality of nodes may be elected to perform the operation in parallel. Alternatively, a centralized controller or a current root node may assign certain nodes the task of precomputing feasibility. Assignment of nodes to precompute feasibility may be optimized for the least possible disruption of current and pending read-write operations.

In certain embodiments, a user interface server 162 may also be provided. User interface server 162 may provide an outside interface, such as to the internet, an intranet, or some other network, which allows users to access storage pool 152, such as for backing up files, retrieving files, or otherwise interacting with storage pool 152.

At various times (in large data centers, as often as once or more a day), one or more disks or other resources (controller nodes, network interfaces, etc.) may fail. When a failure occurs, any file fragments stored on the failed node may need to be replaced. Optimally, the fragment is replaced quickly to return the system to full redundancy. For example, if an original data structure is transformed and divided into six fragments, any four of which may be used to reconstruct the original data structure according to the MDS property, when a node fails, only five fragments remain. It is desirable to replace the lost fragment as quickly as possible to return the optimal six-fragment configuration.

As discussed above, not all possible fragment reconstructions are "feasible" (not all retain the MDS property), and because reconstruction requires transferring data from one of the remaining nodes to the new node, not all reconstructions have the same network cost. As discussed above, the selection of a new location and computation of the new feasible fragment are non-trivial processes, particularly when network costs need to be accounted for.

Thus, in certain embodiments, a set of feasible repairs under various failure scenarios is pre-computed. This pre-computation may be performed by a dedicated predictive repair appliance 164, which may include a processor and memory, an ASIC, and FPGA, a GPU, or other programmable logic with a dedicated feasibility pre-computation function. In other embodiments, pre-computation may be performed on a designated controller, or may be assigned to a storage controller 142 not under significant load. In certain cases, a node with the available computational resources may not be found, in which case the algorithm may "rest" for a short time, and then again poll nodes for available compute resources. Pre-computation may be performed on a single node, or in parallel on a plurality of nodes, according to the needs of a particular embodiment.

Figure 2:
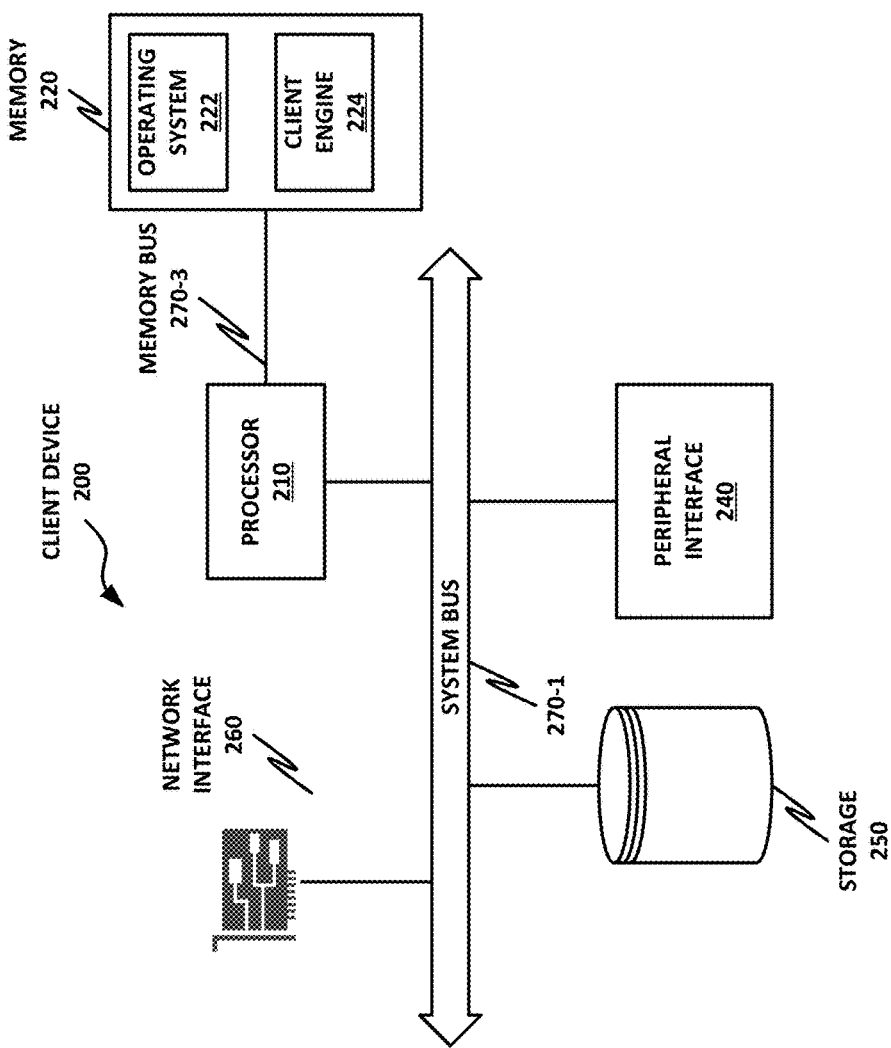
FIG. 2 is a block diagram of a client-class computing device, such as a customer-premises equipment (CPE) or endpoint device, according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a storage client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of storage client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Storage client engine 224, in one example, is operable to carry out computer-implemented methods as described in this specification. Storage client engine 224 may include one or more tangible non-transitory computer-readable mediums having stored thereon executable instructions operable to instruct a processor to provide a storage client engine 224. As used throughout this specification, an "engine" includes any combination of one or more logic elements, of similar or dissimilar species, operable for and configured to perform one or more methods provided by the engine. Thus, storage client engine 224 may comprise one or more logic elements configured to provide methods as disclosed in this specification. In some cases, storage client engine 224 may include a special integrated circuit designed to carry out a method or a part thereof, and may also include software instructions operable to instruct a processor to perform the method. In some cases, storage client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that storage client engine 224 may also include other hardware and software, including configuration files, registry entries, and interactive or user-mode software by way of non-limiting example.

In one example, storage client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of storage client engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
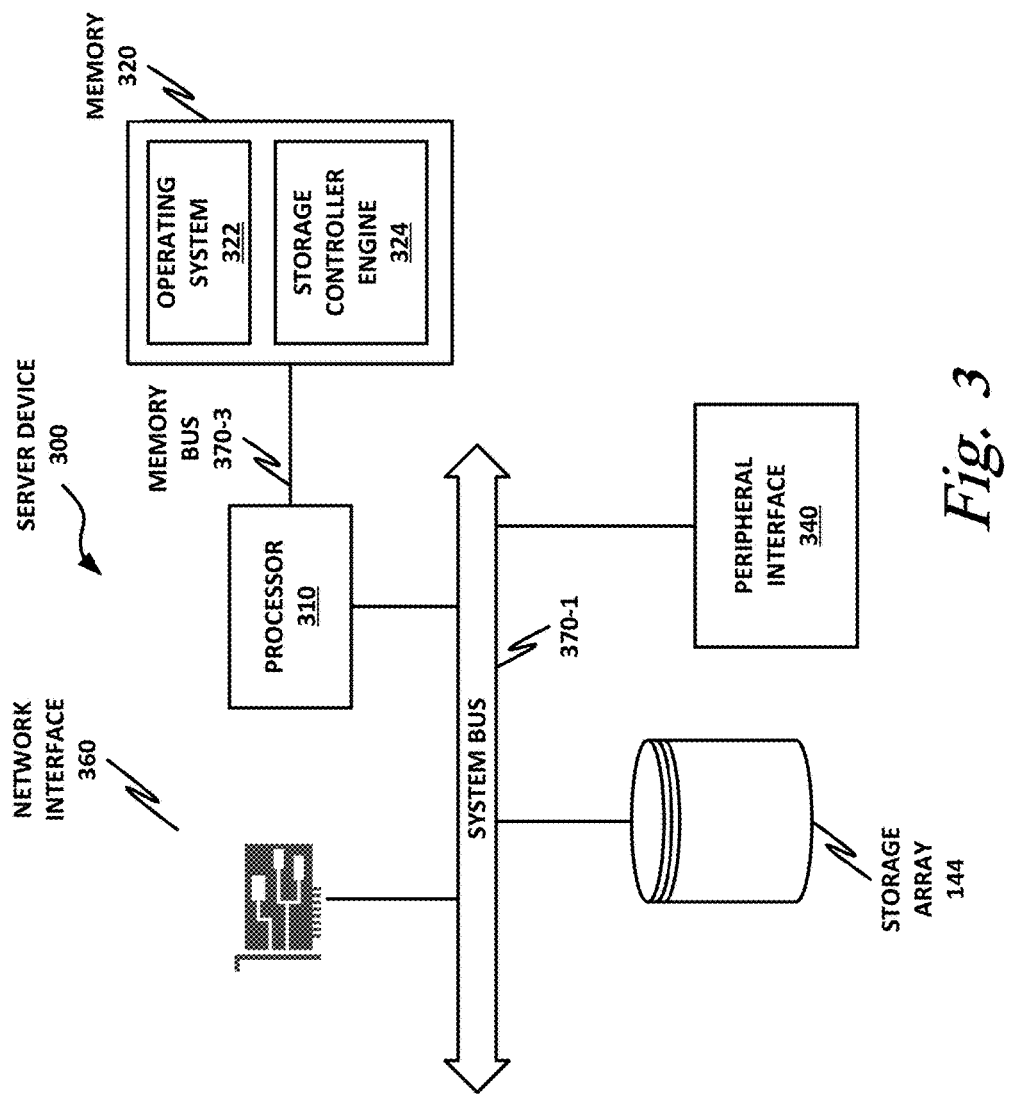
FIG. 3 is a block diagram of a server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein compute device 200 provides certain localized tasks, while server 300 provides certain other centralized tasks. In contemporary practice, server 300 is more likely than compute device 200 to be provided as a "headless" VM running on a computing cluster, or as a standalone appliance, though these configurations are not required.

Any of the servers disclosed herein, such as storage controller 142, user interface server 162, and predictive repair appliance 164 may be examples of servers 300.

Server 300 includes a processor 310 connected to a memory 320, having stored therein executable instructions for providing an operating system 322 and at least software portions of a storage controller engine 324. Other components of server 300 include a storage 144, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 144 may be any species of memory 320, or may be a separate device, as described in connection with storage 250 of FIG. 2. Storage 144 may be, or may include therein, a database or databases or data stored in other configurations, and may include a stored copy of operational software such as operating system 322 and software portions of storage controller engine 324.

Network interface 360 may be provided to communicatively couple server 140 to a wired or wireless network, and may include one or more logic elements as described in FIG. 2.

Storage controller engine 324 is an engine as described in FIG. 2 and, in one example, includes one or more logic elements operable to carry out computer-implemented methods as described in this specification. Software portions of storage controller engine 324 may run as a daemon process.

Storage controller engine 324 may include one or more non-transitory computer-readable mediums having stored thereon executable instructions operable to instruct a processor to provide a storage controller engine 324. At an appropriate time, such as upon booting server 140 or upon a command from operating system 322 or a user 120 or security administrator 150, processor 310 may retrieve a copy of storage controller engine 324 (or software portions thereof) from storage 144 and load it into memory 320. Processor 310 may then iteratively execute the instructions of storage controller engine 324 to provide the desired method.

In certain embodiments, storage controller engine 324 may include a network aware two-stage data repair engine as described herein. The network aware two-stage data repair engine may perform, for example, the methods of FIGS. 7A and 7B.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
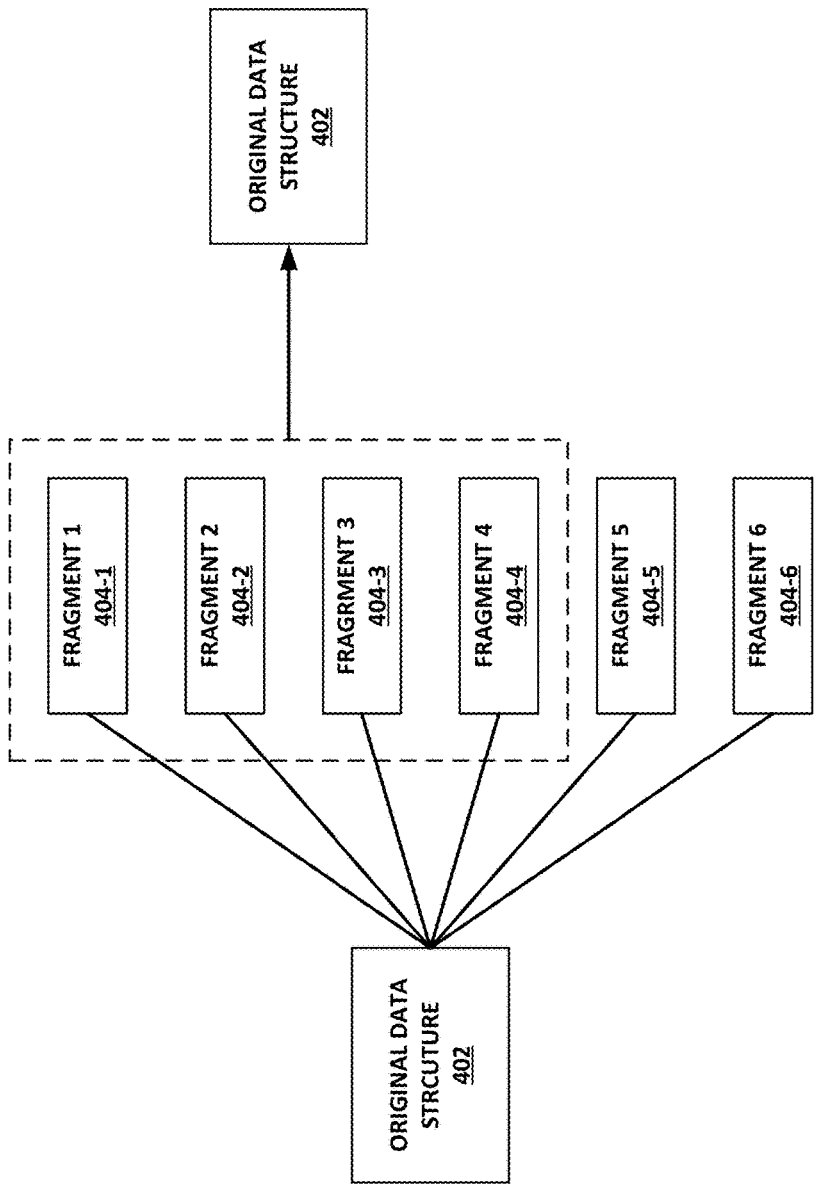
FIGS. 4-6 are block diagrams illustrating the MDS property according to one or more examples of the present specification.
Figure 5:
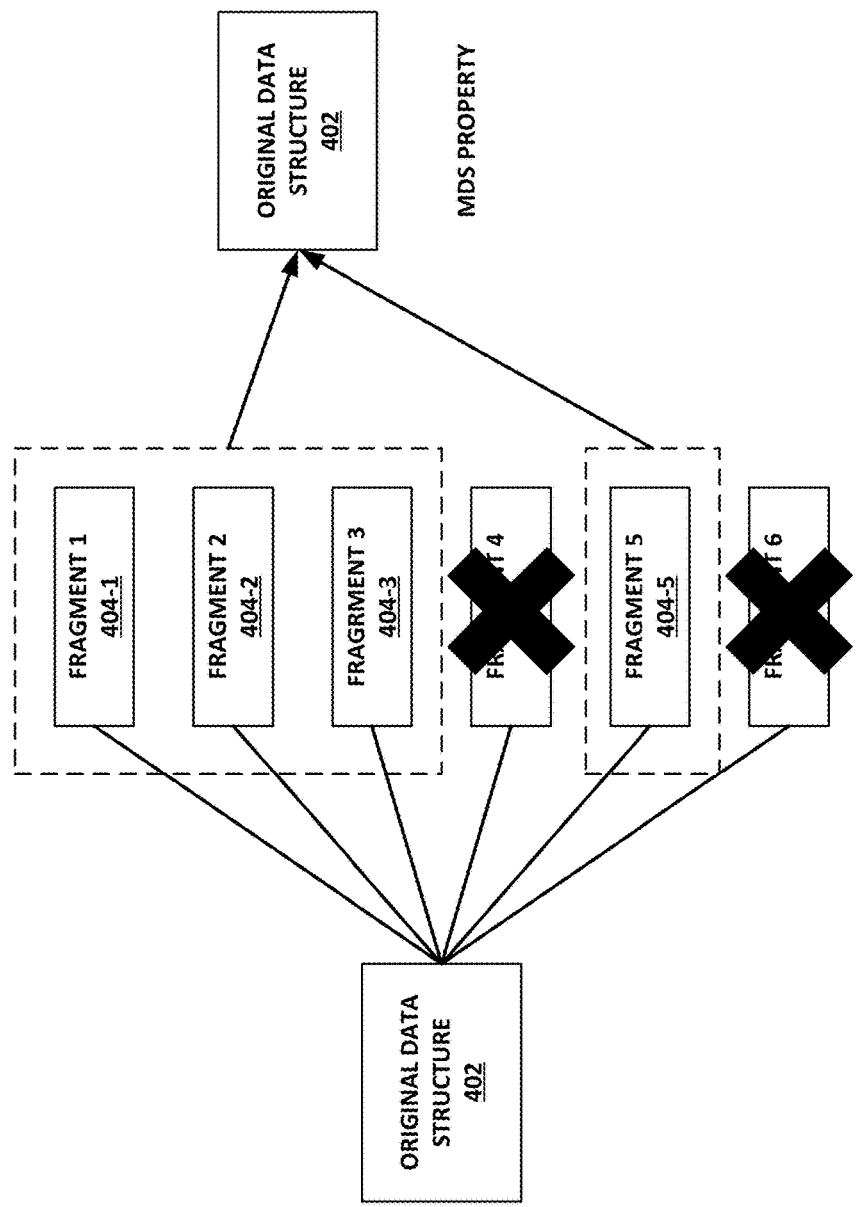
Figure 6:
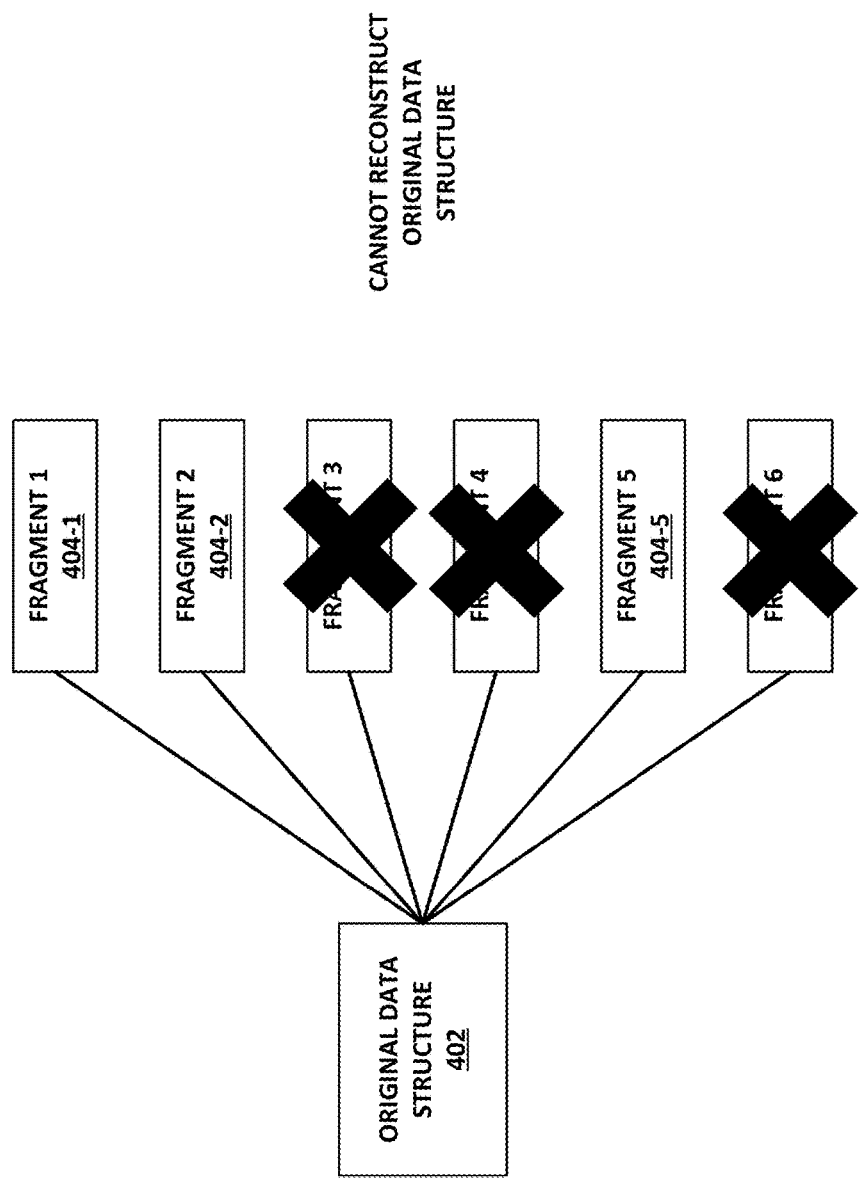

FIGS. 4-6 are block diagrams illustrating the MDS property as discussed herein. It is one objective of certain embodiments of the present method to retain the MDS property when reconstructing erased data. As discussed above, in erasure encoding or (n,k) encoding, an original data structure 402 is mathematically transformed and divided into a plurality of n fragments 404. While the MDS property is preserved, original data structure 402 may be reconstructed from any k fragments. In this example, by way of illustration only, n=6 and k=4. In other words, original data structure 402 is mathematically transformed and divided into fragments 404-1, 404-2, 404-3, 404-4, 404-5, and 404-6. As illustrated, original data structure 402 can be reconstructed from, for example, fragments 404-1, 404-2, 404-3, and 404-4.

FIG. 5 illustrates that any two fragments may fail, for example fragments 404-4 and 404-6. This failure may be the result of a hardware failure, data corruption, or any other cause. Note that simultaneous failure of two nodes is not a common occurrence in contemporary distributed designs. So the illustration here conceptually shows a possibility, but not a likelihood. As long as four nodes remain viable, original data structure 402 can be reconstructed. It is also desirable to return to full redundancy. For example, as illustrated in FIG. 6, if two nodes have already failed, the system cannot tolerate a third failure. If fragments 3, 4, and 6 are all lost, original data structure 402 cannot be reconstructed. Thus, it is desirable to return to a status of six available fragments, to ensure that data are not lost. The failed hardware may be replaced, such as by data center technicians, and a replacement for the lost fragment may then be constructed from the remaining fragments.

Reconstructing a lost fragment is not only computationally intensive, but requires as a prerequisite identifying a set of possible reconstructions, and determining which are feasible (i.e., retain the MDS property). This preliminary feasibility determination may be much more computationally intensive than the reconstruction itself. The question is further complicated if network conditions are considered. For example, if node 6 alone is lost, which four of the remaining five fragments should be used to reconstruct node 6? This will depend not only on which possibilities yield a feasible result, but also on the volume of data that must be transferred from each other node, but also on the network cost of transferring the data. Complicating the question is the fact that network state may change constantly. A path that has light traffic at time $t_0$ may have very heavy traffic an hour later.

However, the fragments do not change rapidly (or at all, usually, unless a node is lost). Thus, in certain embodiments, it is optimal to pre-compute the set of feasible reconstructions. When a node actually fails, network conditions are examined at the time of failure, and weighted network costs are also assigned to each potential reconstruction. Thus, as described in more detail above, an optimal reconstruction can be selected.

Figure 7A:
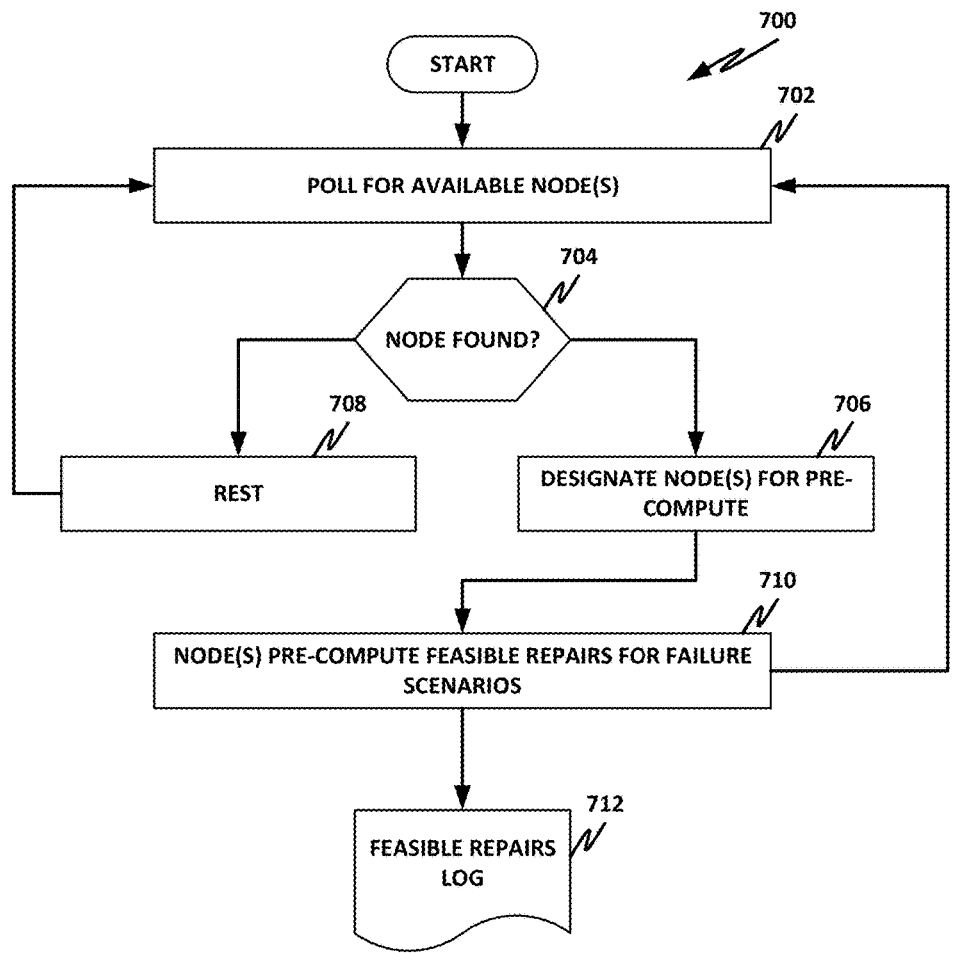
FIGS. 7A and 7B are flow charts of a two-stage network-aware data repair method according to one or more examples of the present specification.
Figure 7B:
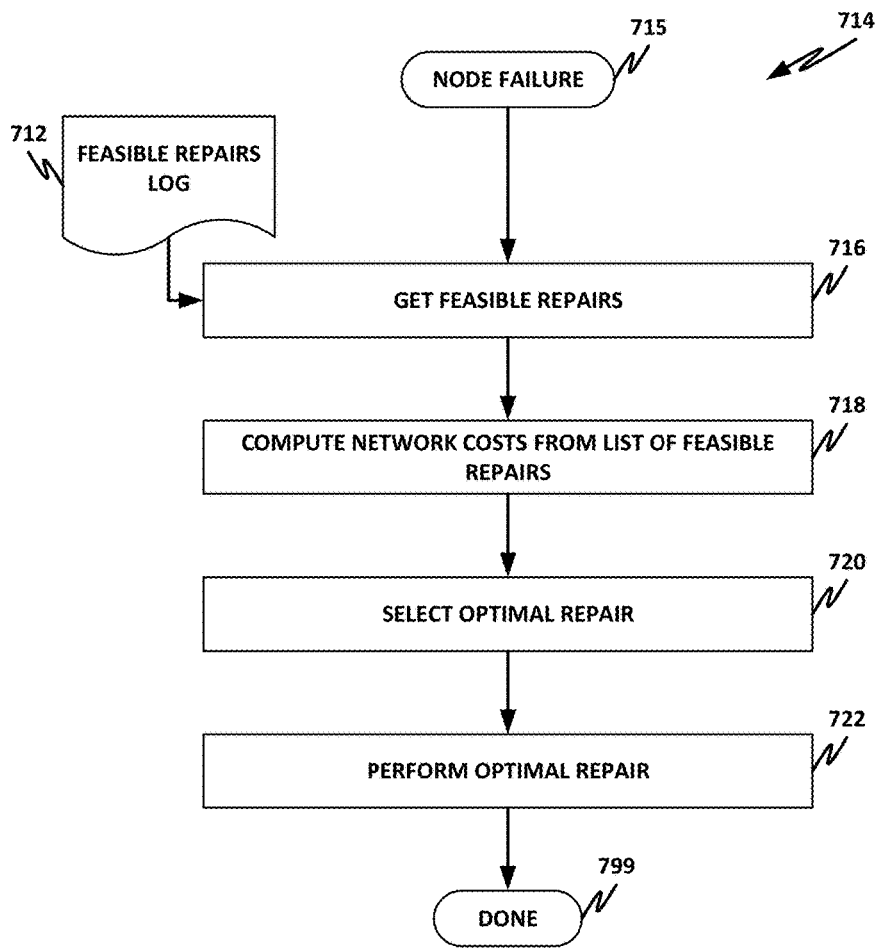

FIGS. 7A and 7B are flow charts of a two-stage method of performing network-aware storage repairs according to one or more examples of the present specification.

In method 700 of FIG. 7A, feasible repairs are pre-computed according to methods disclosed herein. Method 700 may be performed proactively, before any nodes fail. The purpose of method 700 is to produce a feasible repairs log 712, which may include a table or list. For each possible failure scenario, one or more feasible repair options are given for that failure. Because the network state at the time of failure may not be known in advance, embodiments of feasible repair logs 712 do not include network cost analysis. That analysis may be performed at the time of failure.

In block 702, a two-stage network aware data repair engine polls storage controllers in a RAIN configuration to identify a controller with compute bandwidth to perform all or part of a proactive feasible repair analysis. Note that this operation may not be necessary in embodiments where a dedicated predictive repair appliance is used.

In decision block 704, if no available node is found, the program rests for a given time, and then tries again. If a node is found, then in block 706, the one or more nodes identified as available are designated for pre-computing the set of feasible repairs $\Xi_i$.

In block 710, the one or more designated nodes perform their computations. The set of feasible repairs $\Xi_i$ is stored in feasible repairs log 712. In certain embodiments, a repair $\xi_i$ is only stored in feasible repair log if it is at least possible that $\xi_i$ can be an optimal repair. If it is determined (as described above) that $\xi_i$ cannot be the optimal repair, it may be excluded from the log.

Control then passes back to block 702, and updates to feasible repair log 712 are made as necessary.

FIG. 7B is a flow chart of a method 714 of performing a repair upon failure of a node. In this case, feasible repairs log 712 is an input to the process, and an objective is to determine which of the available repairs in optimal in light of current network conditions. The selected optimal repair is then carried out.

In block 715, a node fails, creating the necessity of a repair.

In block 716, the two-stage network-aware repair engine gets the list of feasible repairs for this failure event from feasible repairs log 712.

In block 718, the repair engine computes a weighted network cost for each repair in the list of feasible repairs for this failure.

In block 720, the repair engine selects the optimal repair, which may include weighting repairs according to their network costs, as discussed above.

In block 722, the repair engine carries out the selected optimal repair, restoring the data to its desired level of redundancy.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 310, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 144 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 320 and storage 144, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 310 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: one or more logic elements, including at least one hardware logic element, comprising a network-aware data repair engine to compute a feasible repair log for n fragments of an original data structure, comprising: receiving a predictive failure scenario; identifying at least one repair $\xi_i$ for the failure scenario; determining that $\xi_i$ is feasible; and logging $\xi_i$ to a feasible repair log.

There is further disclosed an example, wherein the n fragments of the original data structure comprise an erasure encoded transformation.

There is further disclosed an example, wherein determining that $\xi_i$ is feasible comprises determining that $\xi_i$ retains the maximum distance separating (MDS) property.

There is further disclosed an example, wherein the network-aware data repair engine is further to react to a failure event, comprising: computing a network cost for at least two repairs $\xi$ of the feasible repair log; and selecting an optimal repair $\xi_0$.

There is further disclosed an example, wherein selecting the optimal repair comprises identifying a repair with a least weighted network cost.

The computing apparatus of claim 1, wherein logging $\xi_i$ to the feasible repair log comprises logging $\xi_i$ only if it is potentially a lowest-cost repair.

There is further disclosed an example, wherein the network-aware data repair engine is to determine that a repair is a potentially lowest-cost repair, comprising sorting surviving nodes in increasing order of repair bandwidth and assigning more fragment transfers to less costly nodes.

There is further disclosed an example, wherein the network-aware data repair engine is to operate on random linear network codes (RLNC) and is to determine that a repair is a potentially lowest-cost repair, comprising considering only repairs wherein a total bandwidth transferred by any L nodes is equal to a size of fragments to be used in the repair.

There is further disclosed an example, wherein the computing apparatus is a predictive repair appliance.

There is further disclosed an example of a method of performing network-aware data repairs to predictively compute a feasible repair log for n fragments of an original data structure, comprising: receiving a predictive failure scenario; identifying at least one repair $\xi_i$ for the failure scenario; determining that $\xi_i$ is feasible; and logging $\xi_i$ to a feasible repair log.

There is further disclosed an example, wherein the n fragments of the original data structure comprise an erasure encoded transformation.

There is further disclosed an example, wherein determining that $\xi_i$ is feasible comprises determining that $\xi_i$ retains the maximum distance separating (MDS) property.

There is further disclosed an example, further comprising: computing a network cost for at least two repairs $\xi$ of the feasible repair log; and selecting an optimal repair $\xi_0$.

There is further disclosed an example, wherein selecting the optimal repair comprises identifying a repair with a least weighted network cost.

There is further disclosed an example, wherein logging $\xi_i$ to the feasible repair log comprises logging $\xi_i$ only if it is potentially a lowest-cost repair.

There is further disclosed an example, wherein the network-aware data repair engine is to determine that a repair is a potentially lowest-cost repair, comprising sorting surviving nodes in increasing order of repair bandwidth and assigning more fragment transfers to less costly nodes.

There is further disclosed an example, wherein the network-aware data repair engine is to operate on random linear network codes (RLNC) and is to determine that a repair is a potentially lowest-cost repair, comprising considering only repairs wherein a total bandwidth transferred by any L nodes is equal to a size of fragments to be used in the repair.

There is further disclosed an example of one or more tangible, non-transitory computer-readable storage mediums having stored thereon executable instructions for instructing one or more processors for providing a network-aware storage repair engine operable for performing any or all of the operations of the preceding examples.

There is further disclosed an example of a method of providing a network-aware storage repair engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   one or more logic elements, including at least one hardware logic element, comprising a network-aware data repair engine to compute a feasible repair log for n fragments of an original data structure, comprising:
   receiving a predictive failure scenario;
   identifying at least one repair $\xi_i$ for the predictive failure scenario;
   determining that $\xi_i$ is a feasible repair to the predictive failure scenario; and
   logging $\xi_i$ to a feasible repair log only if $\xi_i$ is (a) determined to be a feasible repair to the predictive failure scenario and (b) potentially a lowest-cost repair;
   wherein $\xi_i$ is not logged in the feasible repair log if $\xi_i$ is not determined to be a feasible repair or $\xi_i$ is not a potentially a lowest-cost repair option.

2. The computing apparatus of claim 1, wherein the n fragments of the original data structure comprise an erasure encoded transformation.

3. The computing apparatus of claim 2, wherein determining that $\xi_i$ is feasible comprises determining that $\xi_i$ retains the maximum distance separating (MDS) property.

4. The computing apparatus of claim 1, wherein the network-aware data repair engine is further to react to a failure event, comprising:
   computing a network cost for at least two repairs $\xi$ of the feasible repair log; and
   selecting an optimal repair $\xi_o$.

5. The computing apparatus of claim 4, wherein selecting the optimal repair comprises identifying a repair with a least weighted network cost.

6. The computing apparatus of claim 1, wherein the network-aware data repair engine is to determine that a repair is a potentially lowest-cost repair, comprising sorting surviving nodes in increasing order of repair bandwidth and assigning more fragment transfers to less costly nodes.

7. The computing apparatus of claim 1, wherein the network-aware data repair engine is to operate on random linear network codes (RLNC) and is to determine that a repair is a potentially lowest-cost repair, comprising considering only repairs wherein a total bandwidth transferred by any L nodes is equal to a size of fragments to be used in the repair.

8. The computing apparatus of claim 1, wherein the computing apparatus is a predictive repair appliance.

9. A method of performing network-aware data repairs to compute a feasible repair log for n fragments of an original data structure, comprising:
   receiving a predictive failure scenario;
   identifying at least one repair $\xi_i$ for the predictive failure scenario;
   determining that $\xi_i$ is a feasible repair to the predictive failure scenario; and
   logging $\xi_i$ to a feasible repair log only if $\xi_i$ is (a) determined to be a feasible repair to the predictive failure scenario and (b) potentially a lowest-cost repair;
   wherein $\xi_i$ is not logged in the feasible repair log if $\xi_i$ is not determined to be a feasible repair or $\xi_i$ is not a potentially a lowest-cost repair option.

10. The method of claim 9, wherein the n fragments of the original data structure comprise an erasure encoded transformation.

11. The method of claim 10, wherein determining that $\xi_i$ is feasible comprises determining that $\xi_i$ retains the maximum distance separating (MDS) property.

12. The method of claim 9, further comprising:
    computing a network cost for at least two repairs $\xi$ of the feasible repair log; and
    selecting an optimal repair $\xi_o$.

13. The method of claim 12, wherein selecting the optimal repair comprises identifying a repair with a least weighted network cost.

14. The method of claim 9, wherein the network-aware data repair engine is to determine that a repair is a potentially lowest-cost repair, comprising sorting surviving nodes in increasing order of repair bandwidth and assigning more fragment transfers to less costly nodes.

15. The method of claim 9, wherein the network-aware data repair engine is to operate on random linear network codes (RLNC) and is to determine that a repair is a potentially lowest-cost repair, comprising considering only repairs wherein a total bandwidth transferred by any L nodes is equal to a size of fragments to be used in the repair.

16. One or more tangible, non-transitory computer-readable storage mediums having stored thereon executable instructions for performing network-aware data repairs to predictively compute a feasible repair log for n fragments of an original data structure, comprising:
    receiving a predictive failure scenario;
    identifying at least one repair $\xi_i$ for the predictive failure scenario;
    determining that $\xi_i$ is a feasible repair to the predictive failure scenario; and
    logging $\xi_i$ to a feasible repair log only if $\xi_i$ is (a) determined to be a feasible repair to the predictive failure scenario and (b) potentially a lowest-cost repair;
    wherein $\xi_i$ is not logged in the feasible repair log if $\xi_i$ is not determined to be a feasible repair or $\xi_i$ is not a potentially a lowest-cost repair option.

17. The one or more tangible, non-transitory computer-readable storage mediums of claim 16, wherein the n fragments of the original data structure comprise an erasure encoded transformation.

18. The one or more tangible, non-transitory computer-readable storage mediums of claim 17, wherein determining that $\xi_i$ is feasible comprises determining that $\xi_i$ retains the maximum distance separating (MDS) property.

* * * * *